United States Patent
Hirosawa

(10) Patent No.: US 9,658,499 B2
(45) Date of Patent: May 23, 2017

(54) LIQUID CRYSTAL DISPLAY DEVICE COMPRISING A SECOND COMMON ELECTRODE OPPOSED TO A FIRST SLIT AND HAVING A POTENTIAL IDENTICAL TO A POTENTIAL OF A FIRST COMMON ELECTRODE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 50 days.

(21) Appl. No.: 14/560,636

(22) Filed: Dec. 4, 2014

(65) Prior Publication Data

US 2015/0185578 A1 Jul. 2, 2015

(30) Foreign Application Priority Data

Dec. 26, 2013 (JP) ................................. 2013-268749

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/133742* (2013.01); *G02F 2001/134318* (2013.01); *G02F 2001/134381* (2013.01); *G02F 2201/40* (2013.01)

(58) Field of Classification Search
CPC ..... G02F 2001/134381; G02F 2201/40; G02F 1/133707
See application file for complete search history.

(56) References Cited

U.S. PATENT DOCUMENTS

| | | | |
|---|---|---|---|
| 2006/0119758 A1* | 6/2006 | Chai ................. | G02F 1/134309 349/43 |
| 2007/0200990 A1 | 8/2007 | Hirosawa et al. | |
| 2008/0036931 A1* | 2/2008 | Chan ................. | G02F 1/133707 349/38 |
| 2009/0122247 A1* | 5/2009 | Chang ............... | G02F 1/134363 349/139 |
| 2010/0149448 A1* | 6/2010 | Kim .................. | G02F 1/133707 349/42 |

FOREIGN PATENT DOCUMENTS

JP 2007-256908 10/2007
JP 2011-22491 2/2011

* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a liquid crystal display device includes a first substrate including a first common electrode in which a first slit extending in a first direction is formed, a first pixel electrode opposed to the first common electrode, and a second pixel electrode opposed to the first common electrode and neighboring the first pixel electrode in a second direction with the first slit being interposed, a second substrate including a second common electrode opposed to the first slit, the first pixel electrode and the second pixel electrode, and a liquid crystal layer held between the first alignment film and the second alignment film.

8 Claims, 6 Drawing Sheets

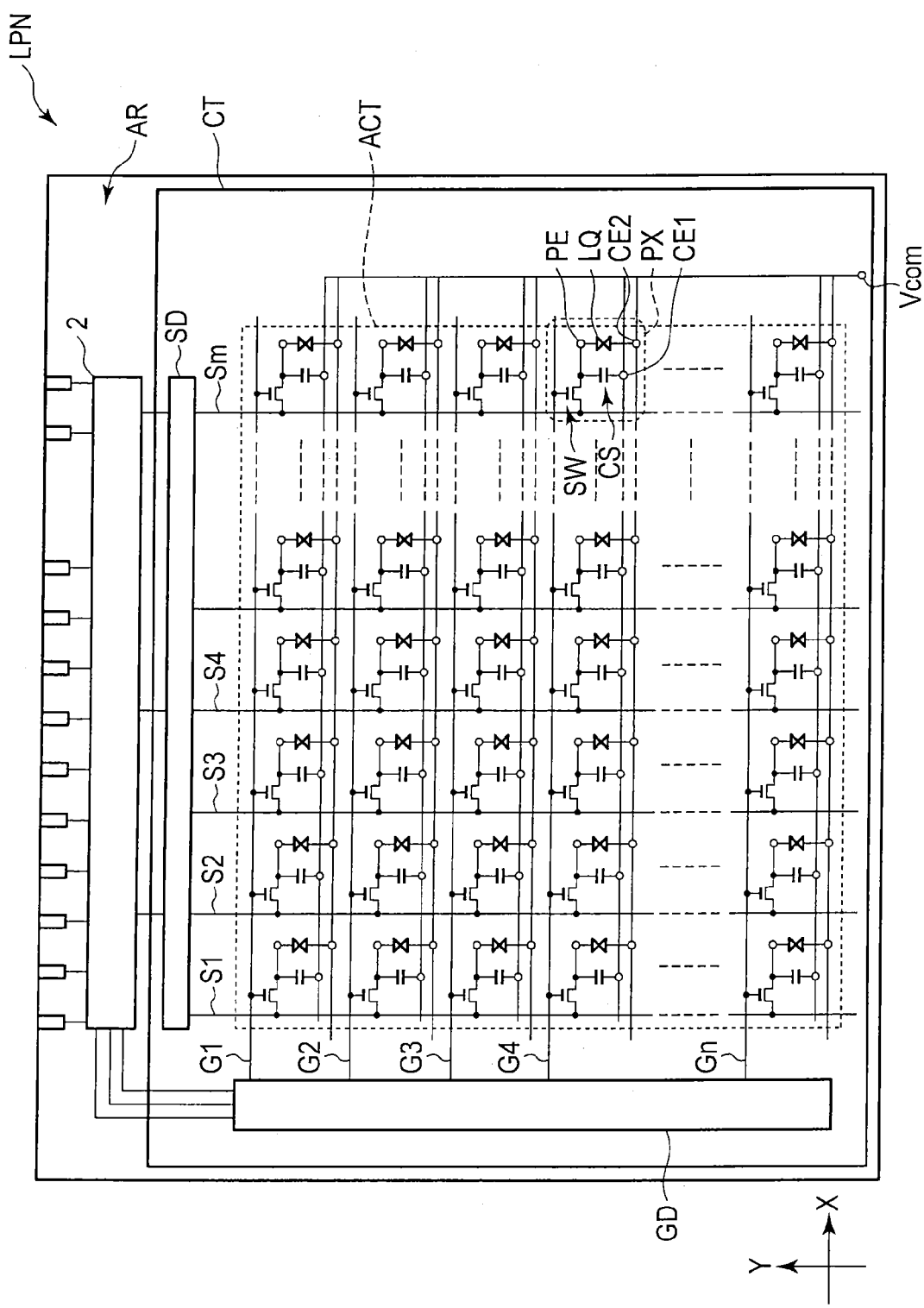
F I G. 1

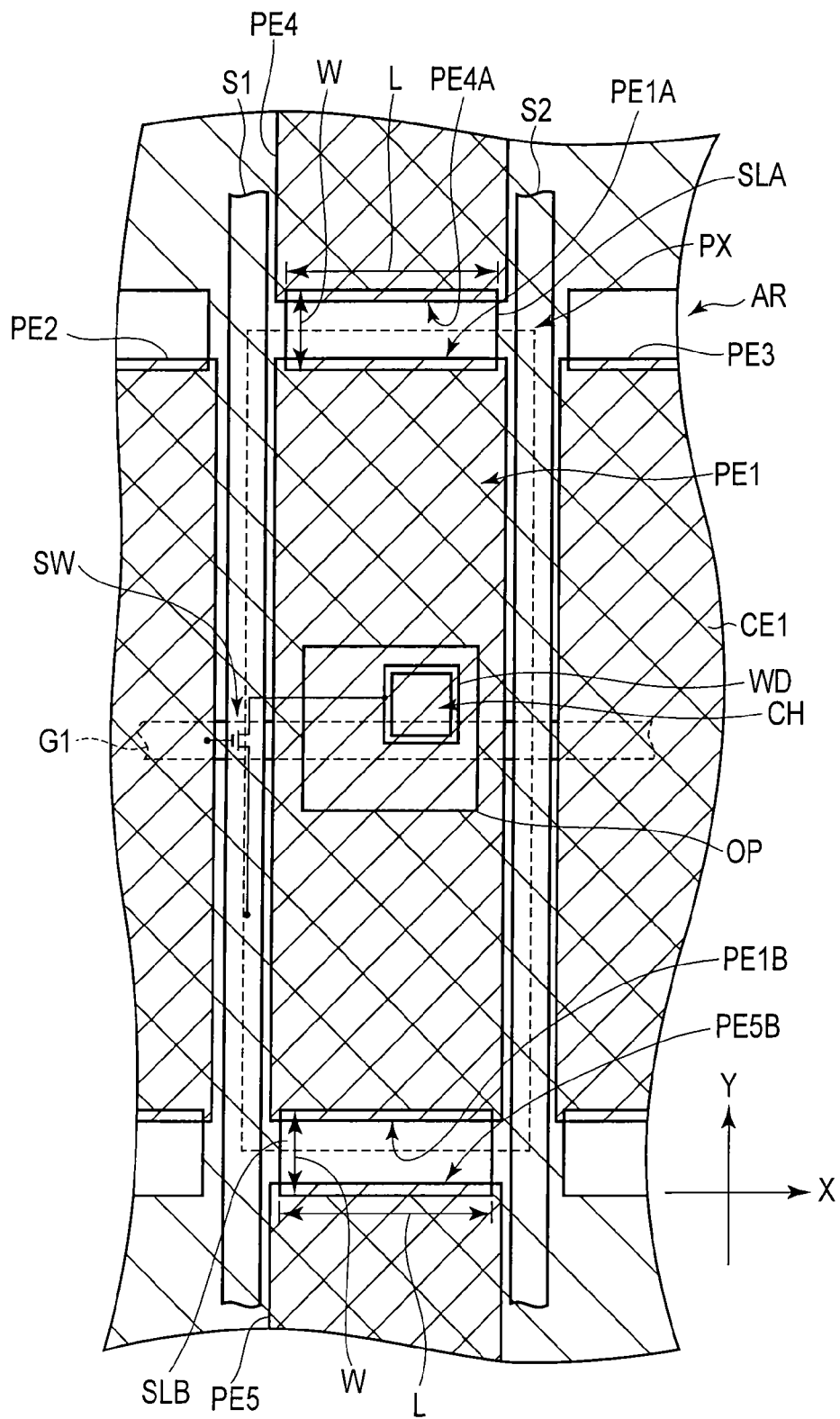
F I G. 2

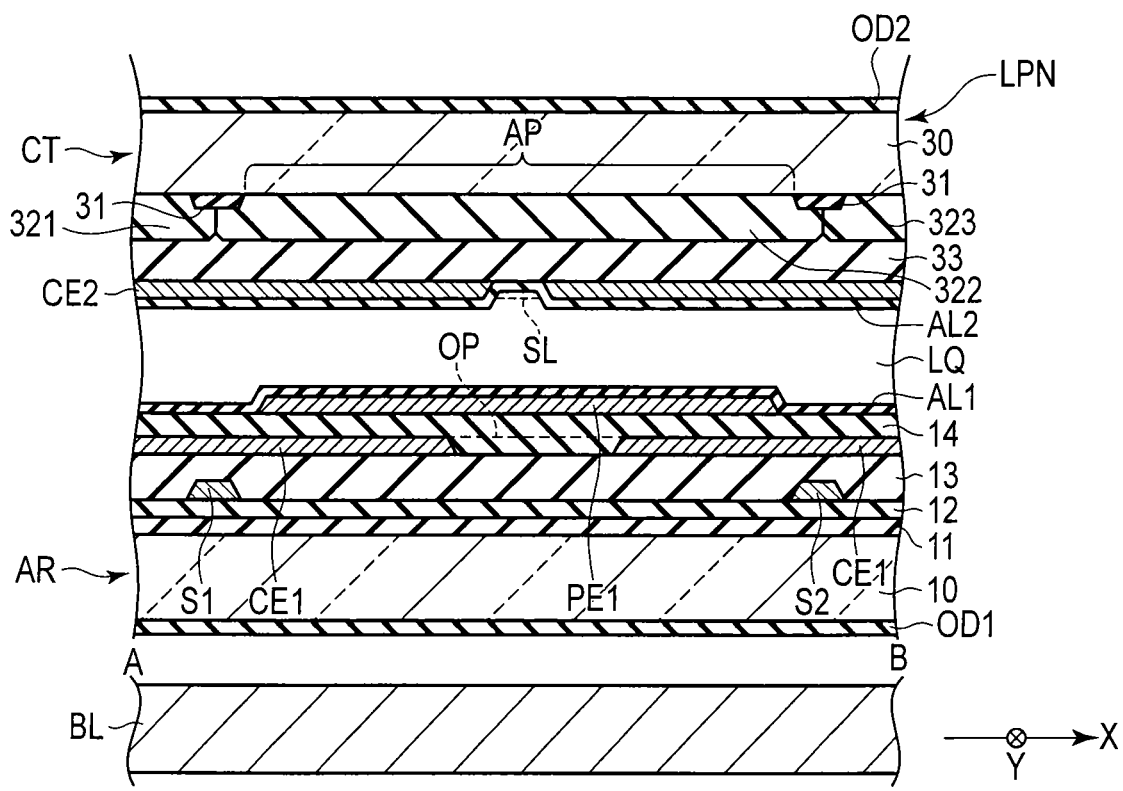
F I G. 5

LIQUID CRYSTAL DISPLAY DEVICE COMPRISING A SECOND COMMON ELECTRODE OPPOSED TO A FIRST SLIT AND HAVING A POTENTIAL IDENTICAL TO A POTENTIAL OF A FIRST COMMON ELECTRODE

CROSS-REFERENCE TO RELATED APPLICATIONS

This application is based upon and claims the benefit of priority from Japanese Patent Application No. 2013-268749, filed Dec. 26, 2013, the entire contents of which are incorporated herein by reference.

FIELD

Embodiments described herein relate generally to a liquid crystal display device.

BACKGROUND

In recent years, liquid crystal display devices of a vertical alignment method, in which liquid crystal molecules with a negative dielectric constant anisotropy are aligned substantially vertical to a substrate, have been put to practical use. Among others, a liquid crystal display device of a multi-domain type, in which directions of inclination of liquid crystal molecules in one pixel are divided between a plurality of regions, has been proposed with various configurations, since a wide viewing angle can be realized.

For example, there is known such a configuration that dielectric projections are discontinuously provided on a counter-electrode, and slits are provided in a pixel electrode so as to be opposed to a part of division of the projections.

In the meantime, in an active-matrix-type liquid crystal display device, a storage capacitance is necessary for holding for a predetermined period a voltage which is applied to a liquid crystal layer. The storage capacitance is constituted by a pair of electrodes or wiring lines, which are opposed via an insulation film. At least one of the electrodes or wiring lines, which constitute the storage capacitance, is formed of a light-shielding material, and serves as a light-shield layer which crosses a pixel. This leads to a decrease in aperture ratio, transmittance or luminance per pixel, which contributes to display. Therefore, there is a demand for improving display quality, while securing a capacitance necessary for display.

BRIEF DESCRIPTION OF THE DRAWINGS

FIG. 1 is a view which schematically illustrates a structure and an equivalent circuit of a liquid crystal display panel LPN which constitutes a liquid crystal display device according to an embodiment.

FIG. 2 is a plan view which schematically illustrates a structure example of one pixel PX and a vicinity of the pixel PX of an array substrate AR which is applicable to the liquid crystal display device of the embodiment.

FIG. 5 is a cross-sectional view, taken along line A-B in FIG. 3, which schematically illustrates a cross-sectional structure of the liquid crystal display panel LPN.

DETAILED DESCRIPTION

Figure 3:
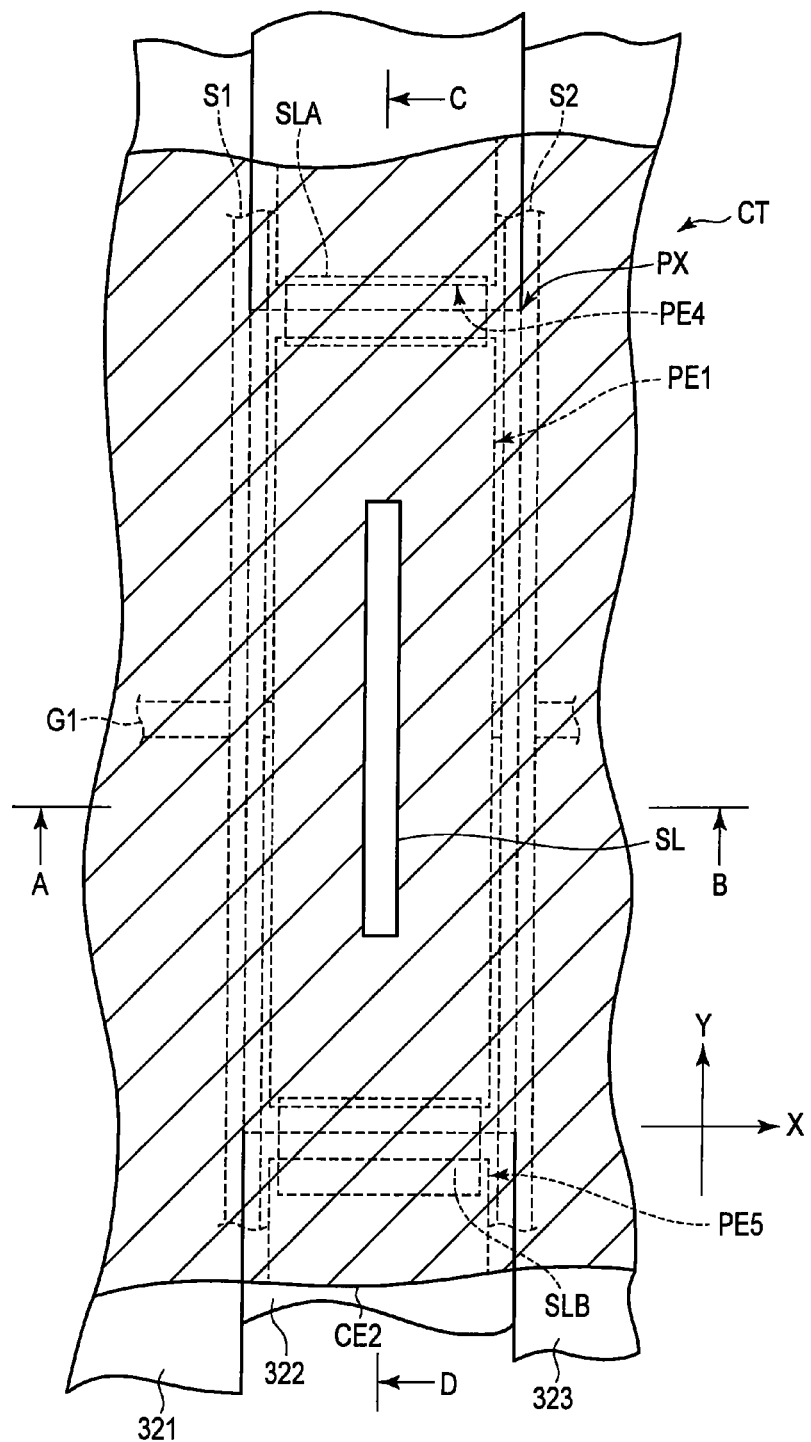
FIG. 3 is a plan view which schematically illustrates a structure example of one pixel PX and a vicinity of the pixel PX of a counter-substrate CT which is applicable to the liquid crystal display device of the embodiment.

In general, according to one embodiment, a liquid crystal display device includes: a first substrate including a first common electrode in which a first slit extending in a first direction is formed, a first pixel electrode opposed to the first common electrode, a second pixel electrode opposed to the first common electrode and neighboring the first pixel electrode in a second direction with the first slit being interposed, and a first alignment film covering the first pixel electrode and the second pixel electrode; a second substrate including a second common electrode opposed to the first slit, the first pixel electrode and the second pixel electrode and having a potential identical to a potential of the first common electrode, and a second alignment film covering the second common electrode; and a liquid crystal layer held between the first alignment film and the second alignment film.

According to another embodiment, a liquid crystal display device includes: a first substrate including a gate line extending in a first direction, a first source line and a second source line each extending in a second direction, a switching element electrically connected to the gate line and the first source line, a first interlayer insulation film covering the switching element, a first common electrode which extends on the first interlayer insulation film and in which a first slit and a second slit each extending in the first direction are formed, a second interlayer insulation film covering the first common electrode, a pixel electrode which is disposed on the second interlayer insulation film, is opposed to the first common electrode and includes a first end portion opposed to the first slit and a second end portion opposed to the second slit, and a first alignment film covering the pixel electrode; a second substrate including a second common electrode opposed to the pixel electrode, the first slit and the second slit and having a potential identical to a potential of the first common electrode, and a second alignment film covering the second common electrode; and a liquid crystal layer held between the first alignment film and the second alignment film.

Embodiments will now be described in detail with reference to the accompanying drawings. Incidentally, in the drawings, the structural elements, which have identical or similar functions, are denoted by like reference numerals, and an overlapping description thereof is omitted.

FIG. 1 is a view which schematically illustrates a structure and an equivalent circuit of a liquid crystal display panel LPN which constitutes a liquid crystal display device according to an embodiment.

Specifically, the liquid crystal display device includes an active-matrix-type liquid crystal display panel LPN. The liquid crystal display panel LPN is configured to include an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arranged in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel PX, a pixel electrode PE which is electrically connected to the switching element SW in each pixel PX, and a first common electrode CE1 which is opposed to the pixel electrode PE. A storage capacitor CS is formed, for example, between the first common electrode CE1 and the pixel electrode PE.

On the other hand, the counter-substrate CT includes, for example, a second common electrode CE2 which is opposed to the pixel electrode PE via the liquid crystal layer LQ.

Each of the gate lines G is led out of the active area ACT and is connected to a first driving circuit GD. Each of the source lines S is led out of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

Each of the first common electrode CE1 and second common electrode CE2 extends over substantially the entirety of the active area ACT and is formed commonly over a plurality of pixels PX. The first common electrode CE1 and second common electrode CE2 are electrically connected to each other and have the same potential. For example, the first common electrode CE1 and second common electrode CE2 are led out of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

FIG. 2 is a plan view which schematically illustrates a structure example of one pixel PX and a vicinity of the pixel PX of the array substrate AR which is applicable to the liquid crystal display device of the embodiment.

The array substrate AR includes a gate line G1, a source line S1, a source line S2, a switching element SW, a first common electrode CE1, and a pixel electrode PE. In the example illustrated, as indicated by a broken line in FIG. 2, the pixel PX has a rectangular shape with a pair of short sides parallel to the first direction X, and a pair of long sides parallel to the second direction Y.

The gate line G1 extends linearly in the first direction X. The source line S1 and source line S2 are disposed with a distance in the first direction X, and extend linearly in the second direction Y, respectively. The length of the pixel PX in the first direction X is substantially equal to the pitch of neighboring source lines in the first direction X. The length of the pixel PX in the second direction Y is substantially equal to the pitch of neighboring gate lines in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is disposed in a manner to cross a central part of the pixel PX. In the present embodiment, as illustrated in the Figure, there is no storage capacitance line which crosses the pixel PX for forming a storage capacitance CS.

The switching element SW is composed of, for example, an n-channel thin-film transistor (TFT), and may be of a top gate type or a bottom gate type, although a detailed illustration is omitted. The switching element SW includes a semiconductor layer of, e.g. polysilicon, a gate electrode connected to the gate line G1, a source electrode which is connected to the source line S1 and is put in contact with the semiconductor layer, and a drain electrode WD which is in contact with the semiconductor layer.

For example, as indicated by upper left to lower right hatching lines in the Figure, the first common electrode CE1 is disposed over substantially the entirety of the pixel PX, and further extends from the pixel PX beyond the source line S1 and source line S2 in the first direction X, and also extends in the second direction Y. Specifically, the first common electrode CE1 is opposed to the source line S1 and source line CE2 and is formed continuously over pixels neighboring the pixel PX in the first direction X. In addition, the first common electrode CE1 is formed continuously over pixels neighboring the pixel PX in the second direction Y. Furthermore, although not described in detail, the first common electrode CE1 is disposed over substantially the entirety of the active area which displays an image, and a part thereof is led out of the active area and electrically connected to the power supply module, as described above.

A slit SLA and a slit SLB are formed in the first common electrode CE1. Each of the slit SLA and slit SLB extends in the first direction X. The slit SLA is located at an upper side end portion of the pixel PX, and is disposed to extend over a boundary between the pixel PX and a pixel neighboring on the upper side. The slit SLB is located at a lower side end portion of the pixel PX, and is disposed to extend over a boundary between the pixel PX and a pixel neighboring on the lower side. In addition, an opening OP for exposing the drain electrode WD is formed in the first common electrode CE1. The opening OP is located between the slit SLA and slit SLB, and is located at a substantially central part of the pixel PX.

In the meantime, the first common electrode CE1 may be formed such that, while the first common electrode CE1 is disposed over substantially the entirety of the pixel PX, the first common electrode CE1 is made discontinuous at an area overlapping the gate line G1, the first common electrode CE1 extends from the pixel PX over the source line S1 and source line S2 in the first direction X, the first common electrode CE1 is opposed to the source line S1 and source line S2, and the first common electrode CE1 is continuously formed in a strip shape over pixels neighboring the pixel PX in the first direction X.

As indicated by lower left to upper right hatching lines in the Figure, a pixel electrode PE1 is formed in an island shape in the pixel PX. The pixel electrode PE is electrically connected to the drain electrode WD of the switching element SW via the opening OP and a contact hole CH overlapping this opening OP. The shape of the pixel electrode PE1 illustrated corresponds to, for example, the shape of the pixel PX, and is a rectangular shape having a less length in the first direction X than in the second direction Y. The pixel electrode PE1 is opposed to the first common electrode CE1.

In addition, similar pixel electrodes PE2 to PE5 are disposed in the other pixels neighboring the pixel PX in the first direction X and second direction Y. These pixel electrodes PE2 to PE5 are also opposed to the first common electrode CE1.

The pixel electrode PE2, pixel electrode PE1 and pixel electrode PE3 are arranged in the named order in the first direction X. The pixel electrode PE4, pixel electrode PE1 and pixel electrode PE5 are arranged in the named order in the second direction Y. The gate line G1 passes through substantially central parts of the pixel electrode PE2, pixel electrode PE1 and pixel electrode PE3, and extends in the first direction X. The source line S1 extends on one end side of the pixel electrode PE1, or between the pixel electrode PE1 and pixel electrode PE2, and extends in the second direction Y. The source line S2 extends on the other end side of the pixel electrode PE1, or between the pixel electrode PE1 and pixel electrode PE3, and extends in the second direction Y. The first common electrode CE1 extends above the source line S1 and source line S2. The pixel electrode PE1 and pixel electrode PE4 neighbor in the second direction Y, with the slit SLA interposed. The pixel electrode PE1 and pixel electrode PE5 neighbor in the second direction Y, with the slit SLB interposed.

Each of the slit SLA and slit SLB is located between the source line S1 and source line S2, and has a length L which is less than the distance between the source line S1 and source line S2 in the first direction X. Specifically, in the X-Y plane, neither the slit SLA nor the slit SLB extends to positions overlapping the source line S1 and source line S2.

The slit SLA has a width W which is equal to or greater than the distance between the pixel electrode PE1 and pixel electrode PE4 in the second direction Y. Specifically, in the X-Y plane, the end portions of the slit SLA overlap the pixel electrode PE1 and pixel electrode PE4. Accordingly, the first common electrode CE1 exists neither at the end portion of the pixel electrode PE1 nor at the end portion of the pixel electrode PE4. Similarly, the slit SLB has a width W which is equal to or greater than the distance between the pixel electrode PE1 and pixel electrode PE5 in the second direction Y. Specifically, in the X-Y plane, the end portions of the slit SLB overlap the pixel electrode PE1 and pixel electrode PE5. Accordingly, the first common electrode CE1 exists neither at the end portion of the pixel electrode PE1 nor at the end portion of the pixel electrode PE5.

In the example illustrated, the slit SLA has a width W which is greater than the distance between the pixel electrode PE1 and pixel electrode PE4, and overlaps an end portion PE1A of the pixel electrode PE1, which is opposed to the pixel electrode PE4, and overlaps an end portion PE4A of the pixel electrode PE4, which is opposed to the pixel electrode PE1 In addition, the slit SLB has a width W which is greater than the distance between the pixel electrode PE1 and pixel electrode PE5, and overlaps an end portion PE1B of the pixel electrode PE1, which is opposed to the pixel electrode PE5, and overlaps an end portion PE5B of the pixel electrode PE5, which is opposed to the pixel electrode PE1. Specifically, if attention is paid to the pixel electrode PE1, the end portion PE1A is opposed to the slit SLA, and the end portion PE1B is opposed to the slit SLB.

In the meantime, in the example illustrated in FIG. 2, the pixels neighboring in the second direction Y are pixels of the same color, and the pixels neighboring in the first direction X are pixels of mutually different colors. Specifically, the pixel electrode PE4, pixel electrode PE1 and pixel electrode PE5, which are arranged in the second direction Y, are opposed to the color filter of an identical color. In addition, the pixel electrode PE2, pixel electrode PE1 and pixel electrode PE3, which are arranged in the first direction X, are opposed to the color filters of different colors.

FIG. 3 is a plan view which schematically illustrates a structure example of one pixel PX and a vicinity of the pixel PX of a counter-substrate CT which is applicable to the liquid crystal display device of the embodiment. FIG. 3 shows only structural parts that are necessary for the description, and the source line S1, source line S2, gate line G1, slit SLA and slit SLB of the first common electrode, pixel electrode PE1, pixel electrode PE4 and pixel electrode PE5, which are main parts of the array substrate, are indicated by broken lines.

The counter-substrate CT includes a second common electrode CE2, etc. The second common electrode CE2 is disposed in the pixel PX, and is opposed to the pixel electrode PE1. The second common electrode CE2 is also opposed to the slit SLA and slit SLB. In addition, the second common electrode CE2 extends from the pixel PX in the first direction X and the second direction Y, and is located also above the source line S1 and source line S2. Specifically, the second common electrode CE2 is disposed continuously over pixels neighboring on the right side and left side along the first direction X of the pixel PX, and over pixels neighboring on the upper side and lower side along the second direction Y of the pixel PX. Furthermore, although not described in detail, the second common electrode CE2 is disposed over almost the entirety of the active area.

A slit SL is formed in the second common electrode CE2 at a position opposed to the pixel electrode PE1. In the example illustrated, the slit SL is formed in a strip shape extending in the second direction Y, and is located substantially at a central part of the pixel PX. This slit SL corresponds to an alignment control member which mainly controls the alignment of liquid crystal molecules. In the meantime, instead of the slit, some other alignment control member, such as a projection stacked on the second common electrode CE2, may be disposed, if such an alignment control member has a function of controlling the alignment of liquid crystal molecules. The shape of the slit SL is not limited to the example illustrated, and may be, for instance, a cross shape.

Besides, the counter-substrate CT includes color filters 321 to 323. The color filters 321 to 323 are color filters of mutually different colors, and are arranged in the named order in the first direction X. In addition, each of the color filters 321 to 323 extends in the second direction Y. In the example illustrated, the color filter 322 is opposed to the pixel electrode PE1, pixel electrode PE4 and pixel electrode PE5 which are arranged in the second direction Y.

Figure 4:
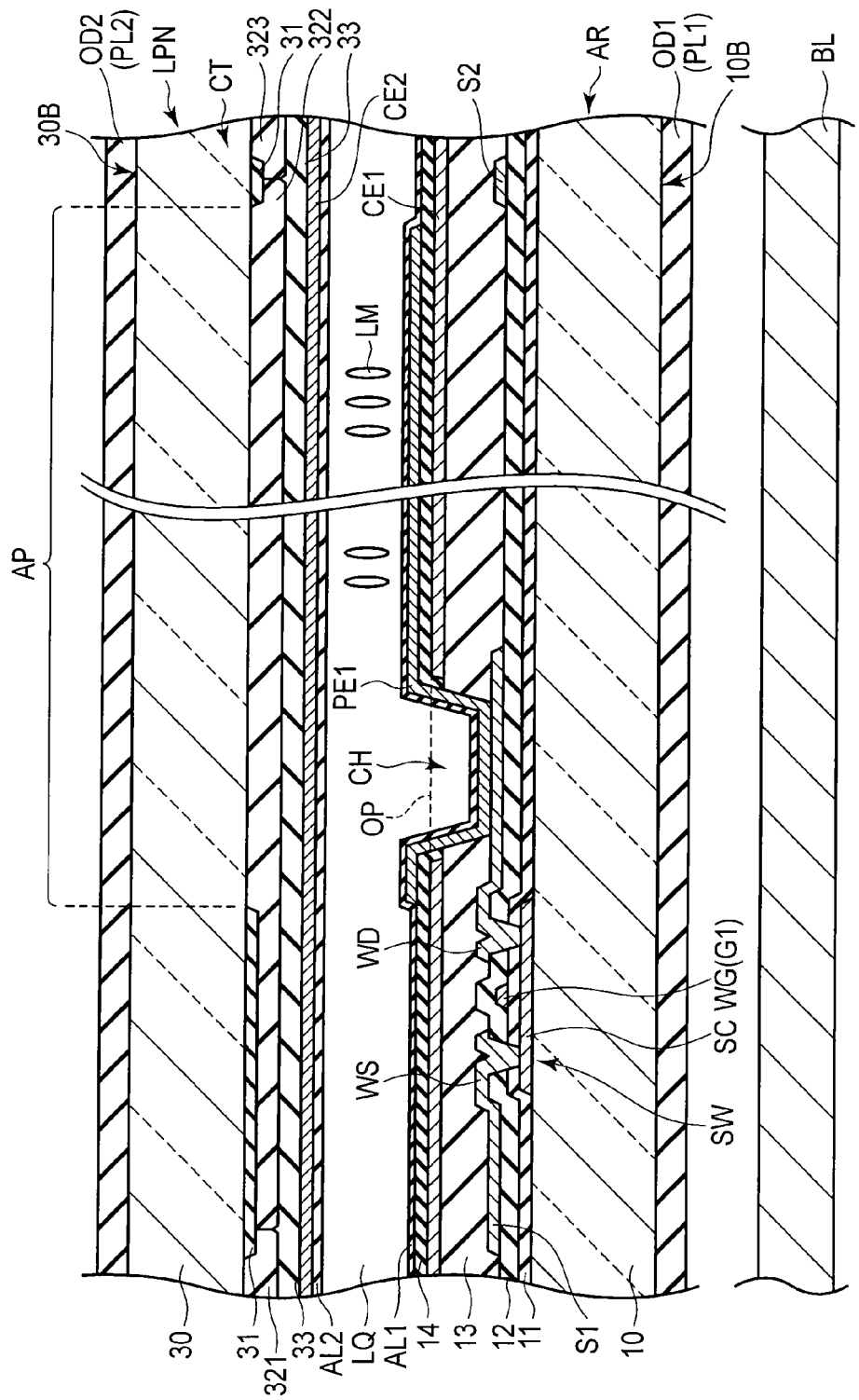
FIG. 4 is a view which schematically illustrates a cross-sectional structure of the liquid crystal display panel LPN in an active area including a switching element SW shown in FIG. 2.

FIG. 4 is a view which schematically illustrates a cross-sectional structure of the liquid crystal display panel LPN in the active area including the switching element SW shown in FIG. 2.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE1, a first insulation film 11, a second insulation film 12, a third insulation film (first interlayer insulation film) 13, a fourth insulation film (second interlayer insulation film) 14, and a first alignment film AL1.

In the example illustrated, the switching element SW is a thin-film transistor of a top gate type. The switching element SW includes a semiconductor layer SC which is disposed on the first insulative film 10. In the meantime, an undercoat layer, which is an insulation film, may be interposed between the first insulative substrate 10 and the semiconductor layer SC. The semiconductor layer SC is covered with the first insulation film 11. The first insulation film 11 is also disposed on the first insulative substrate 10.

A gate electrode WG of the switching element SW is formed on the first insulation film 11, and is located immediately above the semiconductor layer SC. The gate electrode WG is electrically connected to the gate line G1 (or formed integral with the gate line G1) and is covered with the second insulation film 12. The second insulation film 12 is also disposed on the first insulation film 11.

A source electrode WS and a drain electrode WD of the switching element SW are formed on the second insulation film 12. The source line S1 and source line S2 are similarly formed on the second insulation film 12. The source electrode WS illustrated is electrically connected to the source line S1 (or formed integral with the source line S1). The source electrode WS and drain electrode WD are put in contact with the semiconductor layer SC via contact holes penetrating the first insulation film 11 and second insulation film 12. The switching element SW with this structure, as well as the source line S1 and source line S2, is covered with the third insulation film 13. The third insulation film 13 is also disposed on the second insulation film 12. This third insulation film 13 is formed of, for example, a transparent resin material. The third insulation film 13 corresponds to a first interlayer insulation film which covers the switching element SW.

The first common electrode CE1 extends over the third insulation film 13. As illustrated in the Figure, the first common electrode CE1 extends above the source line S1 and source line S2, and further extends toward neighboring pixels. This first common electrode CE1 is formed of a transparent, electrically conductive material such as indium tin oxide (ITO) or indium zinc oxide (IZO). The fourth insulation film 14 is disposed on the first common electrode CE1. A contact hole CH, which penetrates to the drain electrode WD, is formed in the third insulation film 13 and fourth insulation film 14. The contact hole CH is formed in an area overlapping the opening OP of the first common electrode CE1. The fourth insulation film 14 has a less thickness than the third insulation film 13, and is formed of, for example, an inorganic material such as silicon nitride. The fourth insulation film 14 corresponds to a second interlayer insulation film which covers the first common electrode CE1.

The pixel electrode PE1 is formed in an island shape on the fourth insulation film 14 and is opposed to the first common electrode CE1. The pixel electrode PE1 is electrically connected to the drain electrode WD of the switching element SW via the opening OP and contact hole CH. This pixel electrode PE1 is formed of, for example, a transparent, electrically conductive material such as ITO or IZO. The pixel electrode PE is covered with the first alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 321 to 323, an overcoat layer 33, a second common electrode CE2, and a second alignment film AL2.

The light-shield layer 31 partitions each pixel PX in the active area ACT, and forms an aperture portion AP. The light-shield layer 31 is provided at boundaries between color pixels, or at positions opposed to the source lines provided on the array substrate AR. The light-shield layer 31 is formed of a light-shielding metallic material or a black resin material.

Each of the color filters 321 to 323 is formed in the aperture portion AP, and a part thereof overlaps the light-shield layer 31. For example, the color filter 321 is a red color filter formed of a resin material which is colored in red. The color filter 322 is a green color filter formed of a resin material which is colored in green. The color filter 323 is a blue color filter formed of a resin material which is colored in blue. The red color filter 321 is disposed in a red pixel which displays red, the green color filter 322 is disposed in a green pixel which displays green, and the blue color filter 323 is disposed in a blue pixel which displays blue. Boundaries between the color filters of different colors are located at positions overlapping the light-shield layer 31 above the source lines S.

The overcoat layer 33 covers the color filters 321 to 323. The overcoat layer 33 planarizes asperities of the light-shield layer 31 and color filters 321 to 323. The overcoat layer 33 is formed of, for example, a transparent resin material. The overcoat layer 33 serves as an underlayer of the second common electrode CE2.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The first common electrode CE1 and second common electrode CE2 are opposed to each other above the source line S1 and source line S2. This second common electrode CE2 is formed of, for example, a transparent, electrically conductive material such as ITO or IZO. The second common electrode CE2 is covered with the second alignment film AL2.

The first alignment film AL1 and second alignment film AL2 are formed of a material which exhibits vertical alignment properties, and have an alignment restriction force which aligns liquid crystal molecules in a normal direction of the substrate, without requiring alignment treatment such as rubbing.

The above-described array substrate AR and counter-substrate CT are disposed such that their first alignment film AL1 and second alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant in the state in which the cell gap is created. The liquid crystal layer LQ is sealed in the cell gap between the first alignment film AL1 and second alignment film AL2. The liquid crystal layer LQ is composed of a liquid crystal material with a negative (negative-type) dielectric constant anisotropy.

A backlight unit BL is disposed on the back side of the liquid crystal display panel LPN having the above-described structure. Various modes are applicable to the backlight unit BL, but a description of the detailed structure of the backlight unit BL is omitted here.

A first optical element OD1, which includes a first polarizer PL1, is disposed on an outer surface 10B of the first insulative substrate 10. A second optical element OD2, which includes a second polarizer PL2, is disposed on an outer surface 30B of the second insulative substrate 30. The first polarizer PL1 and second polarizer PL2 are disposed, for example, in a positional relationship of crossed Nicols in which their polarization axes are perpendicular to each other.

Figure 6:
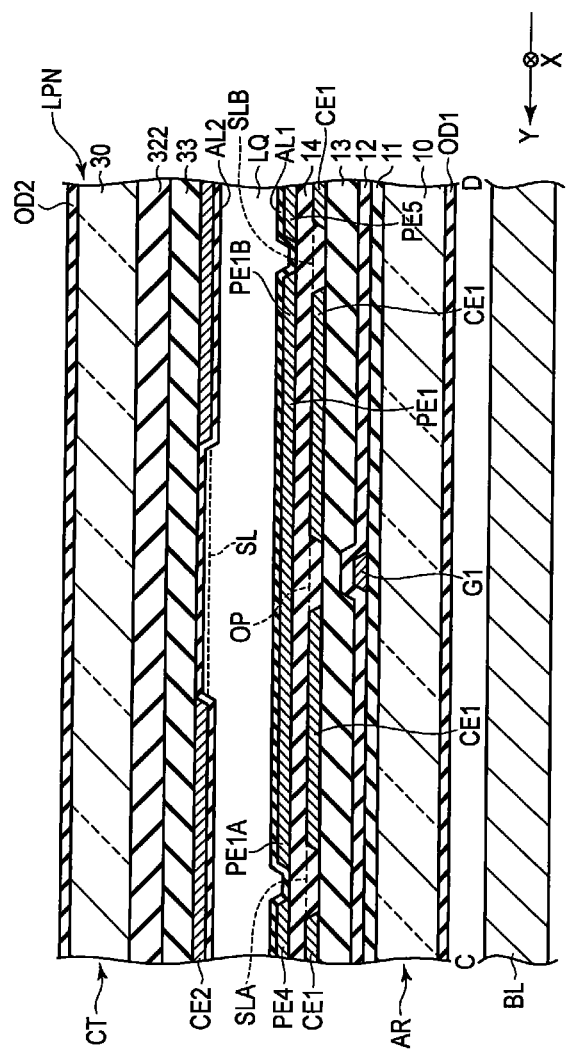
FIG. 6 is a cross-sectional view, taken along line C-D in FIG. 3, which schematically illustrates a cross-sectional structure of the liquid crystal display panel LPN.

FIG. 5 is a cross-sectional view, taken along line A-B in FIG. 3, which schematically illustrates a cross-sectional structure of the liquid crystal display panel LPN. FIG. 6 is a cross-sectional view, taken along line C-D in FIG. 3, which schematically illustrates a cross-sectional structure of the liquid crystal display panel LPN. FIG. 5 and FIG. 6 show only structural parts that are necessary for the description, and the depiction of the switching element is omitted.

In the array substrate AR, the gate line G1 is formed on the first insulation film 11, and is covered with the second insulation film 12. The source line S1 and source line S2 are formed on the second insulation film 12, and are covered with the third insulation film 13. The third insulation film 13 is also disposed on the second insulation film 12.

The first common electrode CE1 is formed on the third insulation film 13, is located above the source line S1 and source line S2, and extends to the inside (i.e. between the source line S1 and source line S2) and the outside of the position immediately above each of the source line S1 and source line S2. The first common electrode CE1 is covered with the fourth insulation film 14. The slit SLA, opening OP and slit SLB are arranged in the named order in the second direction Y. In the slit SLA, opening OP and slit SLB, the fourth insulation film 14 is disposed on the third insulation film 13.

The pixel electrode PE1 is formed in an island shape on the fourth insulation film 14. The pixel electrode PE1 is opposed to the first common electrode CE1, and is also located above the slit SLA, opening OP and slit SLB thereof. To be more specific, the first common electrode CE1 is opposed to the pixel electrode PE1 via the fourth insulation film 14, between the opening OP and slit SLA and between the opening OP and slit SLB. The end portion PE1A of the pixel electrode PE1 is located above the slit SLA. The end portion PE1B of the pixel electrode PE1 is located above the slit SLB.

In the counter-substrate CT, the second common electrode CE2 is opposed to the pixel electrode PE1, is opposed to the slit SLA on the outside of the end portion PE1A of the pixel electrode PE1, and is opposed to the slit SLB on the outside of the end portion PE1B of the pixel electrode PE1. In addition, the second common electrode CE2 is opposed to the first common electrode CE1, without the pixel electrode PE being interposed, above the source line S1 and source line S2. Each of the color filters 321 to 323 extends in the second direction Y.

Next, the operation of the display device in the embodiment is described.

Specifically, in the liquid crystal display device with the above-described structure, in an OFF state in which no potential difference is produced between the pixel electrode PE and the first common electrode CE1 and second common electrode CE2 (i.e. a state in which no voltage is applied to the liquid crystal layer LQ), no electric field is produced between the pixel electrode PE and second common electrode CE2. Thus, as illustrated in FIG. 4, liquid crystal molecules LM included in the liquid crystal layer LQ are initially aligned substantially perpendicular to the substrate major surface (X-Y plane) between the first alignment film AL1 and second alignment film AL2. At this time, of the light from the backlight unit BL, part of linearly polarized light passes through the first polarizer PL1, and enters the liquid crystal display panel LPN. The polarization state of the linearly polarized light, which enters the liquid crystal display panel LPN, hardly varies when the light passes through the liquid crystal layer LQ. Thus, the linearly polarized light emerging from the liquid crystal display panel LPN is absorbed by the second optical element OD2 that is in the positional relationship of crossed Nicols in relation to the first polarizer PL1 (black display).

In an ON state in which a potential difference is produced between the pixel electrode PE and the first common electrode CE1 and second common electrode CE2 (i.e. a state in which a voltage is applied to the liquid crystal layer LQ), a vertical electric field or an inclined electric field avoiding the slits SL is produced between the pixel electrode PE and second common electrode CE2. Thus, the liquid crystal molecules LM are aligned in a direction different from the initial alignment direction, by the effect of the vertical electric field or inclined electric field. Specifically, since negative-type liquid crystal molecules LM are aligned such that their major axes cross the electric field, the liquid crystal molecules LM are aligned in the ON state in an oblique direction or in a horizontal direction, relative to the substrate major surface. In this ON state, the polarization state of the linearly polarized light, which enters the liquid crystal display panel LPN, varies depending on the alignment state of the liquid crystal molecules LM (or the retardation of the liquid crystal layer) when the light passes through the liquid crystal layer LQ. Thus, in the ON state, at least part of the light emerging from the liquid crystal layer LQ passes through the second polarizer PL 2 (white display).

Besides, in the ON state, a storage capacitance CS is formed by the pixel electrode PE and the first common electrode CE1 that are opposed to each other via the fourth insulation film 14, and retains a necessary capacitance for displaying an image. Specifically, a pixel potential, which has been written in each pixel via the switching element SW, is retained by the storage capacitance CS for a predetermined period.

In the meantime, in this embodiment, the case of the linear polarization mode has been illustrated by way of example. However, the embodiment is also applicable to a configuration of a so-called circular polarization mode, in which a ¼ wavelength plate is inserted between each of the linear polarizers, which are disposed on the front and back of the liquid crystal display panel LPN, and the liquid crystal display panel LPN.

According to the present embodiment, the second common electrode CE2 is opposed to the slits SLA and SLB formed in the first common electrode CE1, between the pixel electrodes PE neighboring in the second direction Y. Thus, in the ON state, an equipotential surface along the normal direction of the substrate is not easily formed in the region between the pixel electrodes PE neighboring in the second direction Y. In other words, in the ON state, in the region between the pixel electrodes PE neighboring in the second direction Y, an inclined electric field is formed between the end portion of the pixel electrode PE and the second common electrode CE2. Thereby, not only at the central part of the pixel electrode PE, but also at the region of the end portion of the pixel electrode PE, the state of alignment of liquid crystal molecules LM varies, thus contributing to display.

On the other hand, in a comparative example in which the second common electrode CE2 is opposed to the first common electrode CE1 between the pixel electrodes PE neighboring in the second direction Y, that is, in a comparative example in which no slit is formed in the first common electrode CE1 between the present pixel and a pixel neighboring this pixel in the second direction, an equipotential surface along the normal direction of the substrate is formed in the region between the pixel electrodes PE neighboring in the second direction Y. In other words, between the present pixel and a pixel neighboring this pixel in the second direction, due to the effect of the first common electrode CE1, an inclined electric field, which occurs between the end portion of the pixel electrode PE and the second common electrode CE2, is not easily formed. Thus, also in the ON state, in the vicinity of the pixel PX, the alignment state of liquid crystal molecules LM is kept to be the initial alignment state (vertical alignment state). The region, in which the liquid crystal molecules LM are kept in the initial alignment state, extends to the region of the vicinity of the end portion of the pixel electrode PE. Thus, in the vicinity of the end portion of the pixel electrode PE, there is no contribution to display, despite the ON state. The inventor confirmed that, as regards the transmittance per pixel in the ON state, the transmittance obtained in the present embodiment is 1.25 times higher, when the transmittance obtained in the comparative example was set at 1.

In this manner, according to the present embodiment, compared to the comparative example, the aperture ratio, transmittance or luminance per pixel, which contributes to display, can be enhanced. Therefore, the display quality can be improved, while the capacitance necessary for display is secured.

In addition, the pixel electrodes neighboring in the second direction Y are opposed to the color filter of the identical color. Specifically, the pixel electrodes neighboring in the second direction Y are disposed in association with the pixels which display the same color. Thus, even if the alignment state of liquid crystal molecules LM has changed to the ON state in the region between the neighboring pixel electrodes, a color mixing is hardly visually recognized, and the display quality is not degraded.

Moreover, each of the slit SLA and slit SLB has the length L which is less than the distance between the source line S1 and source line S2 in the first direction X. In the X-Y plane, neither the slit SLA nor the slit SLB extends to positions overlapping the source line S1 and source line S2. Specifically, in the range in which the first common electrode CE1 overlaps the upper side of the source line S1 and source line S2, as the length L becomes greater, the region, where the inclined electric field is formed at the end portion of the pixel electrode PE, becomes larger, and therefore the region which contributes to display can be increased.

Besides, each of the slit SLA and slit SLB has the width W which is equal to or greater than the distance between the pixel electrodes PE neighboring in the second direction Y. In the X-Y plane, the first common electrode CE1 exists neither between the slit SLA and the pixel electrode PE nor between the slit SLB and the pixel electrode PE. Specifically, as the area of disposition of the first common electrode CE1 is smaller between the pixel electrodes PE neighboring in the second direction Y, an equipotential surface along the normal direction of the substrate is less easily formed in the ON state, or in other words, an inclined electric field, which switches the liquid crystal molecules LM, is more easily formed in the vicinity of the end portion of the pixel electrode PE. Accordingly, the area per pixel, which contributes to display, can be increased.

Moreover, according to the embodiment, the capacitance, which is necessary for displaying an image in each pixel, can be produced between the pixel electrode PE and first common electrode CE1 which are opposed to each other via the fourth insulation film 14. Thus, when the capacitance is formed, a wiring line or electrode, which crosses the pixel and is formed of a light-shielding wiring material, does not need to be provided. In addition, the fourth insulation film 14 is formed to have a smaller film thickness than the third insulation film that is formed of a resin material or the like. Therefore, a relatively large capacitance can easily be formed by the pixel electrode PE and first common electrode CE1 which are disposed via the fourth insulation film 14.

Besides, since each of the pixel electrode PE and first common electrode CE1 is formed of a transparent, electrically conductive material, the region where the pixel electrode PE and first common electrode CE1 overlap contributes to display. Thus, compared to a comparative example in which a storage capacitance line crossing the pixel is disposed, the aperture ratio, transmittance or luminance per pixel, which contributes to display, can be enhanced. Therefore, the display quality can be improved, while the capacitance necessary for display is secured.

In addition, the first common electrode CE1 extends above the source line S1 and source line S2. Thus, in the ON state, an undesired leak electric field from the source line S1 and source line S2 toward the liquid crystal layer LQ can be shielded by the first common electrode CE1. Specifically, it is possible to suppress formation of an undesired electric field or an undesired capacitance between the source line S1 and source line S2 and the pixel electrode PE or second common electrode CE2, and to suppress disturbance in alignment of liquid crystal molecules LM in an area overlapping the source line S1 and source line S2.

Furthermore, the liquid crystal molecules LM in the area overlapping the source line S1 and source line S2 maintains the initial alignment state even in the ON state, since the first common electrode CE1 and second common electrode CE2 are kept at the same potential. Therefore, the pixel electrodes PE neighboring in the first direction X can be located closer to each other up to a processing limit, and the area which contributes to display per pixel can further be increased.

Besides, unlike the upper and lower peripheral regions of the pixel, at which the slits SLA and SLB are formed in the first common electrode CE1, no slits are formed in the left and right peripheral regions of the pixel, that is, in the regions in the vicinity of the source lines, and an inclined electric field is hardly formed between the end portion of the pixel electrode and second common electrode CE 2 by the effect of the first common electrode CE1. Thereby, even when one of the pixels, which neighbor with the source line interposed, is in the ON state and the other is in the OFF state, the liquid crystal molecules LM in the area overlapping the source line are kept in the initial alignment state. Therefore, even when the liquid crystal display panel LPN is viewed in an oblique direction, degradation in display quality due to color mixing can be suppressed. In addition, since there is no need to increase the width of the light-shield layer 31 in order to prevent color mixing, the area per pixel, which contributes to display, can further be increased.

As has been described above, according to the present embodiment, a liquid crystal display device, which can improve display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a first common electrode in which a first slit extending in a first direction is formed, a first pixel electrode opposed to the first common electrode, a second pixel electrode opposed to the first common electrode and neighboring the first pixel electrode in a second direction with the first slit being interposed, and a first alignment film covering the first pixel electrode and the second pixel electrode;
   a second substrate including a second common electrode opposed to the first slit, the first pixel electrode and the second pixel electrode and having a potential identical to a potential of the first common electrode, and a second alignment film covering the second common electrode; and
   a liquid crystal layer held between the first alignment film and the second alignment film,
   wherein the first substrate further includes a gate line extending in the first direction through a center of the first pixel electrode, a first source line extending on one end side of the first pixel electrode in the second direction, and a second source line extending on the other end side of the first pixel electrode in the second direction, and the first common electrode extends above the first source line and the second source line.

2. The liquid crystal display device of claim 1, wherein the first common electrode and the second common electrode are opposed to each other above the first source line and the second source line.

3. The liquid crystal display device of claim 1, wherein the first slit has a length which is equal to or less than a distance between the first source line and the second source line in the first direction.

4. The liquid crystal display device of claim 1, wherein the first slit has a width which is equal to or greater than a distance between the first pixel electrode and the second pixel electrode in the second direction.

5. The liquid crystal display device of claim 4, wherein the first slit overlaps a first end portion of the first pixel electrode, which is opposed to the second pixel electrode, and a second end portion of the second pixel electrode, which is opposed to the first pixel electrode.

6. The liquid crystal display device of claim 1, wherein the second substrate further includes a color filer of an identical color, which is opposed to the first pixel electrode and the second pixel electrode.

7. The liquid crystal display device of claim 1, wherein the first alignment film and the second alignment film are formed of a material which exhibits vertical alignment properties.

8. The liquid crystal display device of claim 1, wherein a third slit extending in the second direction is formed in the second common electrode.

* * * * *